United States Patent [19]

Zbikowski et al.

[11] Patent Number: 5,758,360
[45] Date of Patent: May 26, 1998

[54] META-DATA STRUCTURE AND HANDLING

[75] Inventors: Mark Zbikowski, Woodinville; Brian T. Berkowitz, Bellevue; Robert I. Ferguson, Seattle, all of Wash.

[73] Assignee: Microsoft Corporation, Redmond, Wash.

[21] Appl. No.: 693,491

[22] Filed: Aug. 2, 1996

Related U.S. Application Data

[63] Continuation of Ser. No. 85,483, Jun. 30, 1993, abandoned.

[51] Int. Cl.$^6$ .................................................. G06F 12/02
[52] U.S. Cl. ........................ 707/205; 707/101; 707/103
[58] Field of Search .............................. 395/621, 427, 395/444, 401; 707/205, 101, 103

[56] References Cited

U.S. PATENT DOCUMENTS

| | | | |
|---|---|---|---|
| 4,536,837 | 8/1985 | Olson et al. | 395/600 |
| 4,775,969 | 10/1988 | Osterlund | 369/53 |
| 5,119,291 | 6/1992 | Flannagan et al. | 315/275 |
| 5,200,864 | 4/1993 | Dunn et al. | 360/48 |
| 5,206,939 | 4/1993 | Yanai et al. | 395/401 |
| 5,276,874 | 1/1994 | Thomson | 395/600 |
| 5,297,124 | 3/1994 | Plotkin et al. | 369/32 |
| 5,301,304 | 4/1994 | Menon | 395/427 |
| 5,394,534 | 2/1995 | Kulakowski et al. | 395/425 |
| 5,410,694 | 4/1995 | Uchida et al. | 395/600 |
| 5,454,103 | 9/1995 | Coverston et al. | 395/621 |
| 5,506,983 | 4/1996 | Atkinson et al. | 395/621 |
| 5,613,105 | 3/1997 | Zbikowski et al. | 395/611 |

FOREIGN PATENT DOCUMENTS 0 347 032 A2  12/1989  European Pat. Off. .......... G06F 3/06

OTHER PUBLICATIONS

IBM Corporation, "Tool to Examine the Efficiency of File Placement on Disk,"*IBM Technical Disclosure Bulletin* 34(5):422–423, Oct. 1991.
IBM Corporation, "Order–Preserving Hashing Using Positional Character Transition Frequencies, "*IBM Technical Disclosure Bulletin* 29(12):5256–5260, May 1987.
W. Richard Stevens, *Advanced Programming in the UNIX Environment*, pp. 56–60, 92–95 and 99–101 (1993) Jun. 1993.

*Primary Examiner*—Thomas G. Black
*Assistant Examiner*—Hosain T. Alam
*Attorney, Agent, or Firm*—Christensen O'Connor Johnson & Kindeness PLLC

[57] ABSTRACT

A file system stores data and meta-data in a like fashion. The lowest level of stored file data on disk is a stream, which constitutes a logically contiguous group of bytes. Related streams, such as found in a file, a directory or a subdirectory, are stored in a variable-sized onode data structure. Variable-sized onode data structures are stored in an array of fixed-sized buckets of disk space. Related onode data structures are stored within catalog data structures. The catalog data structures are stored within the array of fixed-sized buckets of disk space. The array of buckets of fixed-sized buckets of disk space is, in turn, stored as a stream.

19 Claims, 11 Drawing Sheets

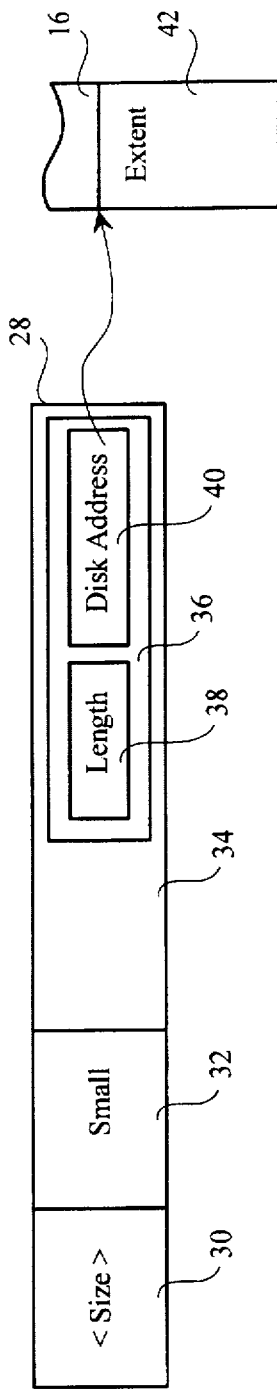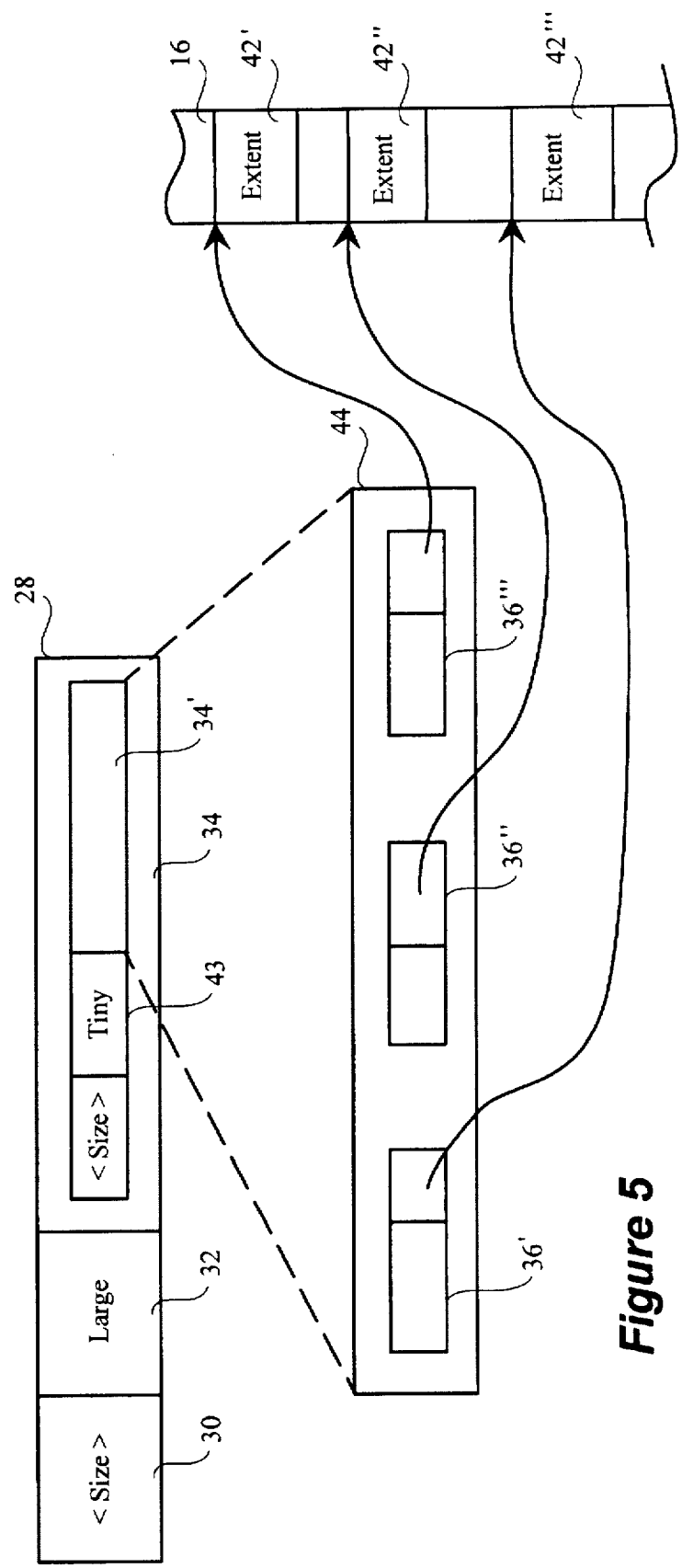
Figure 4
Figure 5

1

META-DATA STRUCTURE AND HANDLING

CROSS-REFERENCE TO RELATED APPLICATION

This application is a continuation of U.S. patent application No. 08/085,483, filed Jun. 30, 1993, now abandoned.

TECHNICAL FIELD

The present invention relates generally to data processing systems and, more particularly, to storage of data on disk by a file system.

BACKGROUND OF THE INVENTION

Conventional file systems have had difficulty in storing file data on disk in an efficient manner. Many conventional systems have adopted an approach wherein all data is stored in a single-sized storage unit on disk. Unfortunately, this approach does not efficiently store file data on disk. In particular, file data may vary in size and, thus, may not be well-matched for the predetermined storage unit size. Other conventional systems have provided a user with an option of adopting one of numerous different formats. The decision as to which format to adopt must be made before the file data is available to the user. As a result, the choice of format by the user is merely speculative and often does not correspond well with the actual file data. As a result, the file data is often inefficiently stored.

In conventional operating systems, each file is allocated a fixed number of blocks of disk space for storing file data and control information about the file. The blocks are fixed-sized so that the units may be quickly allocated and deallocated. The control information for the files and the file data are often variable-sized, which poses at least two problems. First, when the file data and/or control information is not large enough to fill a block, disk space within the allocation unit is wasted. Second, when the file data and/or control information is too large to be stored in a single block, it must be stored in multiple blocks and multiple pointers are maintained to specify where the data is stored. Maintaining and using such pointers is often quite cumbersome.

In conventional file systems, data and meta-data (i.e., data that describes the storage of other data) have been treated as distinct entities. In particular, data and meta-data have been stored in different formats in conventional file systems. Moreover, separate tools have been provided for acting on data and meta-data. This fragmented view of data and meta-data has resulted in added overhead and complexity.

SUMMARY OF THE INVENTION

In accordance with the first aspect of the present invention, a method is practiced in a data processing system having disk storage and a processing means for running an operating system. In this method, the data is stored in the disk storage in a first variable-sized stream data structure. Meta-data is stored in the disk storage in a second variable-sized stream data structure. A stream descriptor is stored for each of the stream data structures. The stream descriptor includes a type identifier that identifies how the stream data structure is stored on disk in disk storage.

In accordance with another aspect of the present invention, streams of data are stored in stream data structures in the disk storage. The streams of data are formed from logically contiguous bytes of data. A stream descriptor is stored for each stream data structure in the disk storage. Each stream descriptor includes a type identifier that describes how the stream data structure is stored in the disk storage. The stream data structures which store related data are stored in a first variable-sized data structure along with their associated stream descriptors.

In accordance with yet another aspect of the present invention, streams of data are stored in the disk storage in stream data structures. A stream descriptor is stored for each stream data structure on the disk storage. Each stream descriptor includes a type identified that describes how the stream data structures are stored in the disk storage. Stream data structures which store related data are stored in the disk storage along with their associated stream descriptors in a variable-sized data structure. Groups of the variable-sized data structures which store related data are stored in a catalog data structure.

In accordance with yet another aspect of the present invention, a method is practiced in a data processing system having disk storage. In this method, streams of data are stored in the disk storage in stream data structures. The streams are formed by logically contiguous bytes of data. A stream descriptor is stored for each stream data structure in the disk storage. The stream data structures which store related data are stored along with their associated stream descriptors in respective variable-sized data structures in the disk storage. Each variable-sized data structure has an associated identifier. The variable-sized data structures are stored in an array of fixed-sized identifiable buckets of disk space in the disk storage. A mapping structure holding entries that specify a bucket identifier for a bucket in the array is stored in the disk storage. The entries are indexed by the identifiers of the variable-sized data structures. The mapping structure is used to locate one of the variable-sized data structures in the array, given its identifier.

BRIEF DESCRIPTION OF THE DRAWINGS

FIG. 4 is a diagram of a stream descriptor for a small stream in accordance with the preferred embodiment of the present invention.

FIG. 5 is a diagram of a stream descriptor for a large stream in accordance with the preferred embodiment of the present invention.

DETAILED DESCRIPTION OF THE INVENTION

The preferred embodiment of the present invention provides a file system that stores both data and meta-data on disk as groups of "streams." A "stream" is a logically contiguous, randomly addressable, variable-sized array of bytes of data that serves as the logical unit of storage on the disk. Most programmatic access to data in files is made through streams. Each stream may be stored on the disk in one of a number of different representations. Each of the different representations is well suited for a particular size and use of the stream. Accordingly, each stream is stored in a representation on disk that is best suited for its size.

Each stream has a stream descriptor associated with it and which is stored in a file system control structure. The stream descriptor is used to access the stream and to obtain information about the stream. The stream descriptor provides a description of the representation in which the data of the streams is stored. Streams of data that hold related data are encapsulated into data structures known as onodes. An onode is a variable-sized structure that is roughly analogous to a file, a directory or a subdirectory. Groups of related onodes are, in turn, stored in data structures known as object store catalogs or object stores. Thus, data and meta-data (such as the object store catalogs) are described in a like fashion in a hierarchy which will be described in more detail below.

Figure 1:
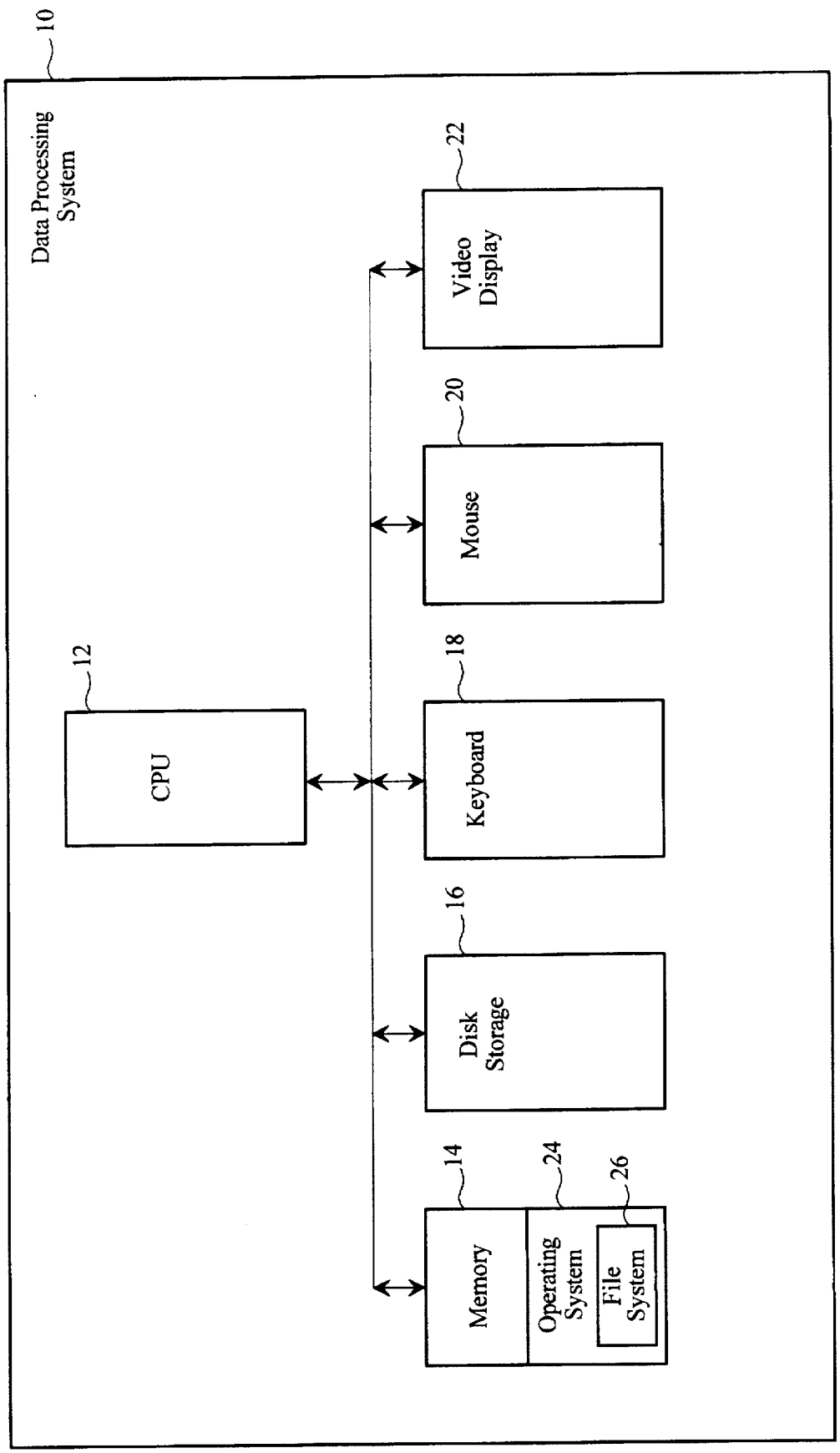
FIG. 1 is a block diagram of a data processing system for practicing a preferred embodiment of the present invention.

FIG. 1 is a block diagram of a data processing system 10 for practicing the preferred embodiment of the present invention. Although the system 10 of FIG. 1 is a single processor system, those skilled in the art will appreciate that the present invention may also be practiced in a multiple processor system, such as a distributed system. The data processing system 10 includes a central processing unit (CPU) 12, a memory 14, disk storage 16, a keyboard 18, a mouse 20, and a video display 22. The disk storage 16 may include hard disks and other types of disk storage devices. The keyboard 18, mouse 20, and video display 22 are conventional input/output devices.

The memory 14 holds a copy of an operating system 24, including a file system manager 26 for managing files stored in the system. The operating system 24 may be an object-oriented operating system. The preferred embodiment of the present invention described herein is implemented as part of the operating system 24. Although the preferred embodiment of the present invention is described as being part of the operating system 24, those skilled in the art will appreciate that the present invention may alternatively be implemented in other types of code that are separate from the operating system.

Figure 2:
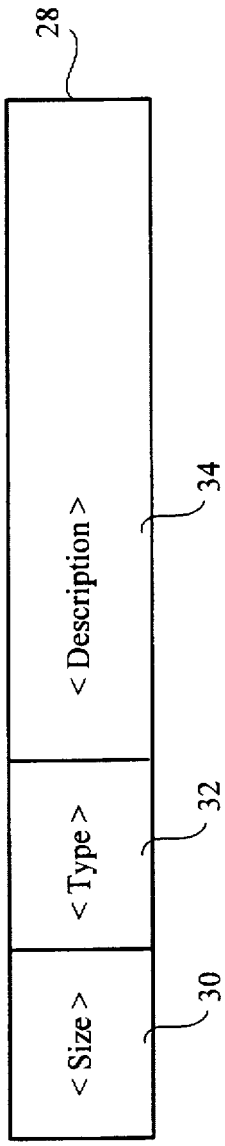
FIG. 2 is a diagram of the format for a stream descriptor that is used in the preferred embodiment of the present invention.

As mentioned above, streams are available in a number of different representations in the preferred embodiment of the present invention. In order to understand the different representations of streams, it is helpful to review the format of the stream descriptors that are provided for the streams. FIG. 2 is a diagram of the format of a stream descriptor 28. The stream descriptor 28 is capable of describing each of the different representations of streams that are available in the preferred embodiment of the present invention. The stream descriptor 28 includes three fields: a size field 30, a type field 32 and a description field 34. The size field 30 holds a value that specifies the size of the stream in bytes. The type field 32 specifies the type of the stream, and the description field 34 holds a description of the stream (i.e., the form of the description field 34). The values held in fields 30, 32 and 34 vary with the representation of the associated stream (as will be described in more detail below).

Figure 3:
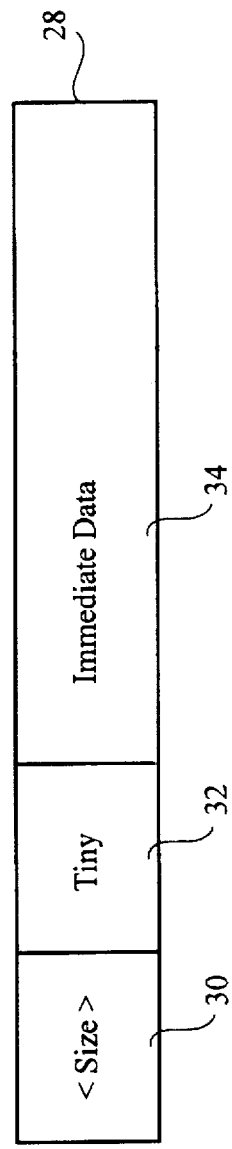
FIG. 3 is a diagram of a stream descriptor for a tiny stream in accordance with the preferred embodiment of the present invention.

A "tiny stream" is a first representation of a stream that is available in the preferred embodiment of the present invention. The tiny stream is used to store data that is very small in size relative to the allocation unit of the storage medium (i.e., a disk in the disk storage 16). The "allocation unit" of the storage medium refers to the basic unit of disk memory space in disk storage 16 that is allocated for storing files. For instance, in FAT-based file systems, the minimum allocation unit is a sector. Unfortunately, a sector is often much larger than stream data produced in the system 10. FIG. 3 depicts the format of the stream descriptor 28 for the tiny stream. The size field 30 holds a value that specifies the size of the stream, and the type field 32 specifies that the stream is a tiny stream. The description field 34 holds the data of the stream and, thus, provides an immediate representation of the data of the stream. This immediate representation provides a very efficient means for storing small amounts of data. In particular, the data is integrated directly into the stream descriptor so that it may be easily and quickly accessed.

Another representation that is available in the preferred embodiment of the present invention is a small stream. The "small stream" is a stream that is stored in a single extent of data. An extent is a variable-sized contiguous run of allocation units. The stream data is stored in an extent because it is too large to store directly in the stream descriptor 28. The format of the stream descriptor 28 for the small stream is shown in FIG. 4. The type field 32 specifies that the associated stream is a small stream, and the description field 34 holds an extent descriptor 36 that describes an extent 42 in which the data of the stream is stored. The extent 42 is stored on a disk in the disk storage 16. The extent descriptor 36 includes two subfields 38 and 40. Subfield 38 holds a value that specifies the length of the extent 42, and subfield 40 holds the disk address of the extent (i.e., where the extent is located in the logical address space of the disk).

A third representation that is available in the preferred embodiment of the present invention is a "large stream." The large stream is a stream stored in multiple extents. The large stream is appropriate for storing a stream having a large amount of data. FIG. 5 depicts the format of the stream descriptor 28 for such a large stream. Type field 32 specifies that the stream is a large stream. The description field 34 holds a second stream descriptor 43 that describes a stream 44 holding extent descriptors. This second stream descriptor 43 describes a tiny stream and includes a description field 34' that holds the stream 44 of extent descriptors. The extent descriptors 36', 36" and 36'" have the same format as the extent descriptor 36 that was described with reference to FIG. 4. As a result, multiple extents 42', 42" and 42'" are described by a single stream 34'. If the number of extent descriptors becomes too large, the second stream descriptor 43 may describe a small stream rather than a tiny stream. Moreover, if the number of extent descriptors becomes too large for a small stream, the second stream descriptor 43 may describe a large stream. Large streams are generally used where large contiguous blocks of disk space are not available. The large stream facilitates the storage of large amounts of data as a single stream in extents that may be dispersed about the disk. As a result, large streams scale well as disks become more fragmented and the stream grows.

As the size of a stream grows, the representation of the stream is promoted up a hierarchy of stream representations to facilitate efficient storage of the stream. The hierarchy includes the tiny stream, the small stream and the large stream. A stream may be promoted from a tiny stream to a small stream and then to a large stream. In general, as was mentioned above, the most appropriate representation is chosen for a stream based upon the amount of data and the amount of fragmentation that are included in the stream.

Figure 6:
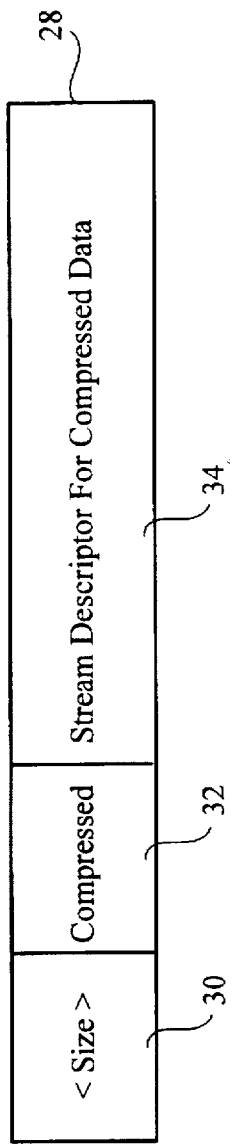
FIG. 6 is a diagram of a stream descriptor for a compressed stream in accordance with the preferred embodiment of the present invention.

The above description has described the four basic types of streams available in the preferred embodiment of the present invention. The type field 34 of stream descriptor 28 may also be utilized to specify special descriptions of data stored within a stream. FIG. 6 is an example of the format of the stream descriptor 28 when a stream holds compressed data. The type field 32 holds a value specifying that the data of the stream is compressed, whereas the description field 34 holds a stream descriptor for the compressed data. The stream descriptor held in the description field 34 may be a tiny stream, a small stream, or a large stream, depending upon the amount of data included in the stream.

Figure 7:
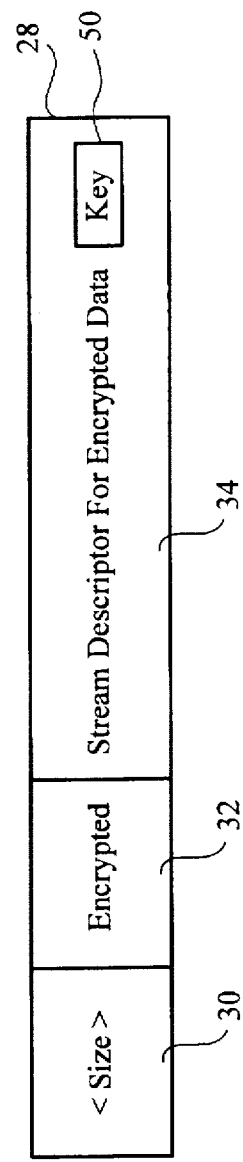
FIG. 7 is a diagram of a stream descriptor for an encrypted stream in accordance with the preferred embodiment of the present invention.

FIG. 7 depicts the format of a stream descriptor 28 when the stream descriptor describes a stream of encrypted data. Type field 32 holds a value which specifies that the stream holds encrypted data. The description field 34 holds a stream descriptor for the encrypted data. The stream descriptor also includes an encryption key value 50. The encryption key value 50 may be used to decrypt the data stored in the stream. The stream descriptor for the encrypted data that is held in the description field 34 may be a tiny stream, a small stream, or a large stream.

Figure 8:
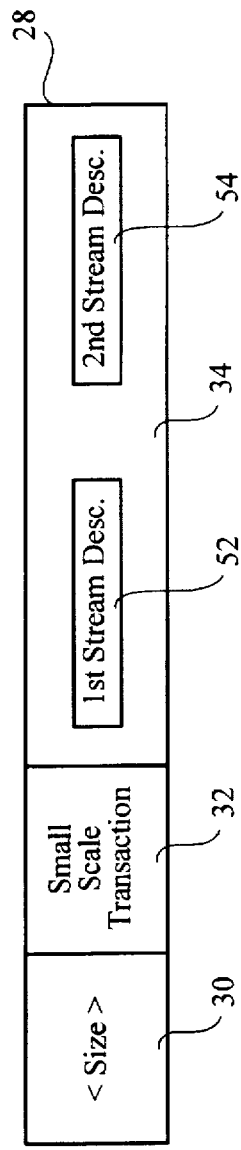
FIG. 8 is a diagram of a stream descriptor for a small scale transaction in accordance with the preferred embodiment of the present invention.

Another example of the use of the type field 32 to specify special descriptions of data is shown in FIG. 8. FIG. 8 shows the stream descriptor 28 for a small scale transaction. A small scale transaction refers to an instance wherein changes to data in a database are recorded without directly changing the data until a sufficient number of other changes have occurred to warrant incurrence of the overhead associated with changing all of the affected data. The type field 32 specifies that the description field 34 holds data for a small scale transaction. The description field 34 holds a first stream descriptor 52 and a second stream descriptor 54. The first stream descriptor 52 describes an original stream of data. The second stream descriptor 54 describes a stream that specifies the changes that have been made to the original stream. The original stream of data is updated by implementing the changes held in the second stream.

Figure 9:
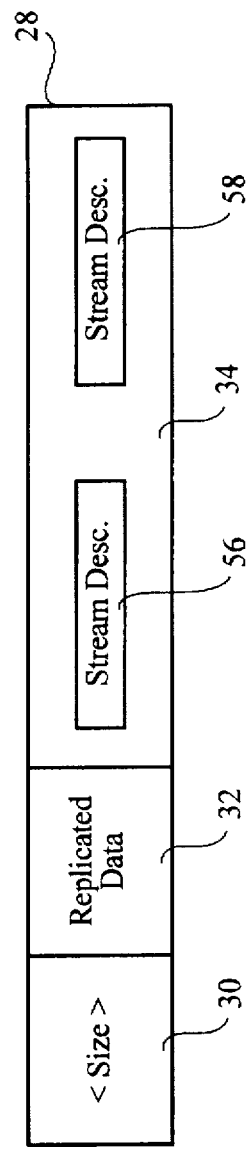
FIG. 9 is a diagram of a stream descriptor for replicated data in accordance with the preferred embodiment of the present invention.

FIG. 9 shows an example of the stream descriptor 28 for a stream that holds replicated data. Data often must be replicated so that loss of the data will not be catastrophic. Specifically, there are selected data structures for which the system maintains multiple copies on disk. In such instances, the structures are copied to two different locations on the disk. The stream descriptor 28 includes a first stream descriptor 56 and a second stream descriptor 58 in its description field 34. The first stream descriptor 56 describes a first stream holding a first copy of the data, and the second stream descriptor 58 describes a second stream holding another copy of the data. The type field 32 holds a value specifying that the stream includes replicated data.

Figure 10:
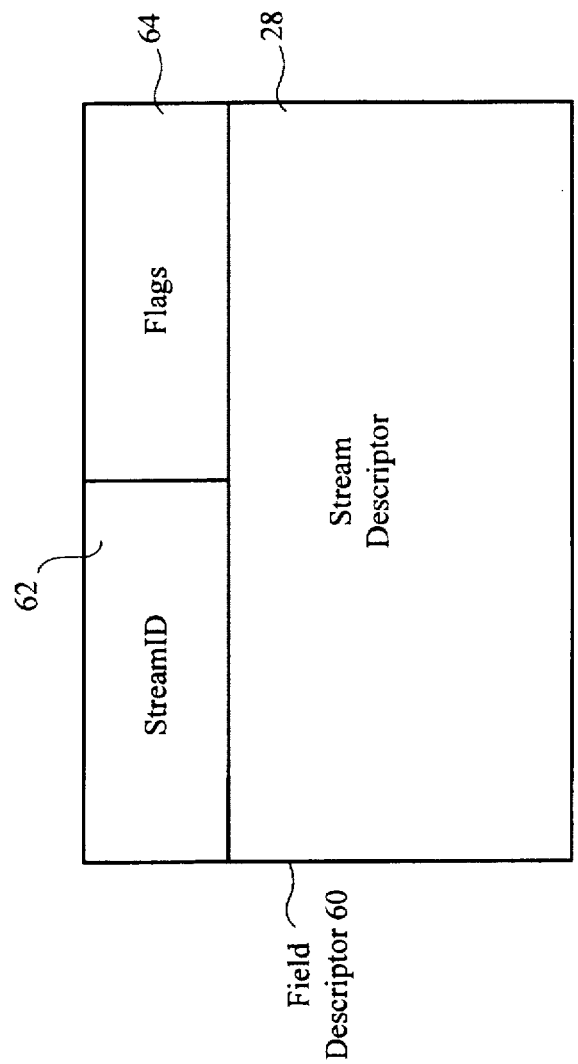
FIG. 10 is a diagram of a field descriptor in accordance with the preferred embodiment of the present invention.

The preferred embodiment of the present invention stores information about streams in a field descriptor 60 like that shown in FIG. 10. The field descriptor 60 includes a stream ID field 62 that holds a stream ID. The stream ID is a four-byte long identification number that uniquely identifies the stream within an onode (onodes will be described in more detail below). The field descriptor 60 further includes a flags field 64 that holds flag bits. The final field of the field descriptor 60 is the stream descriptor 28 for the stream.

Streams are grouped according to related functionality into "onodes". An onode corresponds with the logical notion of an object and typically holds all of the streams that constitute a file, a directory or a subdirectory. Each onode includes information necessary to describe the variable-sized collection of streams that it includes.

Figure 11:
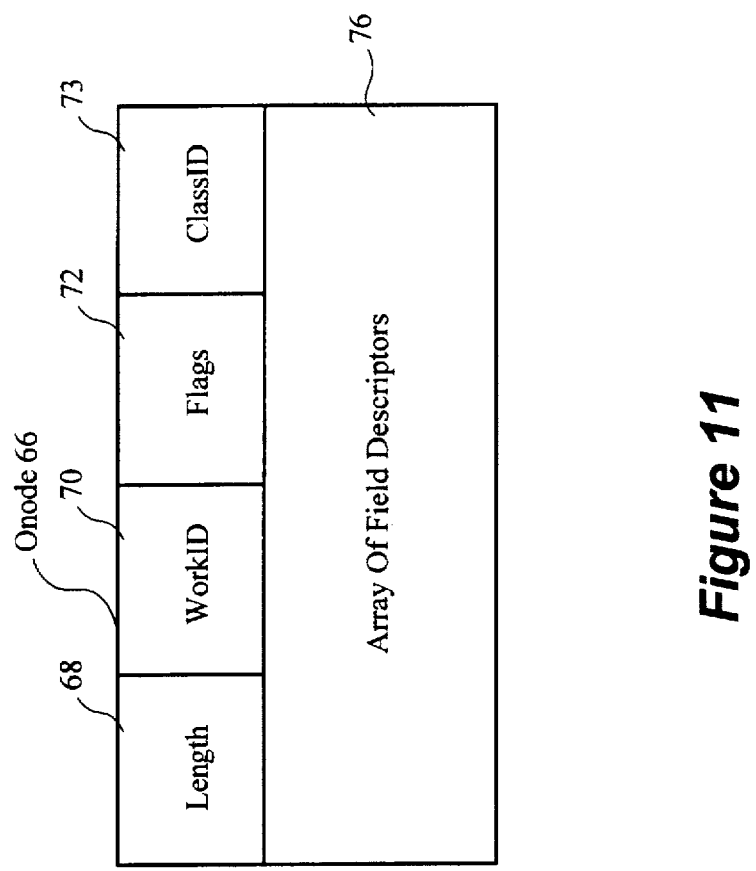
FIG. 11 is a diagram of an onode in accordance with the preferred embodiment of the present invention.

FIG. 11 is a diagram that illustrates the format of an onode 66. Each onode 66 holds streams of related functionality. Each onode 66 includes the following fields: a length field 68, a work ID field 70, a flags field 72, a class ID field 73 and a field 76 that holds an array of field descriptors 60 (such as depicted in FIG. 10). The length field 68 holds a value that specifies the length of the onode, whereas the work ID field 70 holds an index into a work ID mapping array 104 (FIG. 14), as will be described in more detail below. The work ID is four bytes in length. The flags field 72 (FIG. 11) holds flag bits, and the class ID field 73 holds a class ID for the onode. Field 76 holds a packed array of field descriptors 60, that includes a field descriptor 60 for each of the streams held with the onode 66. The number of streams included in the array of field descriptors of field 76 may vary. Moreover, the length of each stream in the array of field descriptors of field 76 may vary. Accordingly, the onode 66 is a variable-sized structure. The variable-sized nature of onodes 66 helps to minimize internal fragmentation in allocation units on disk in disk storage 16.

Figure 12:
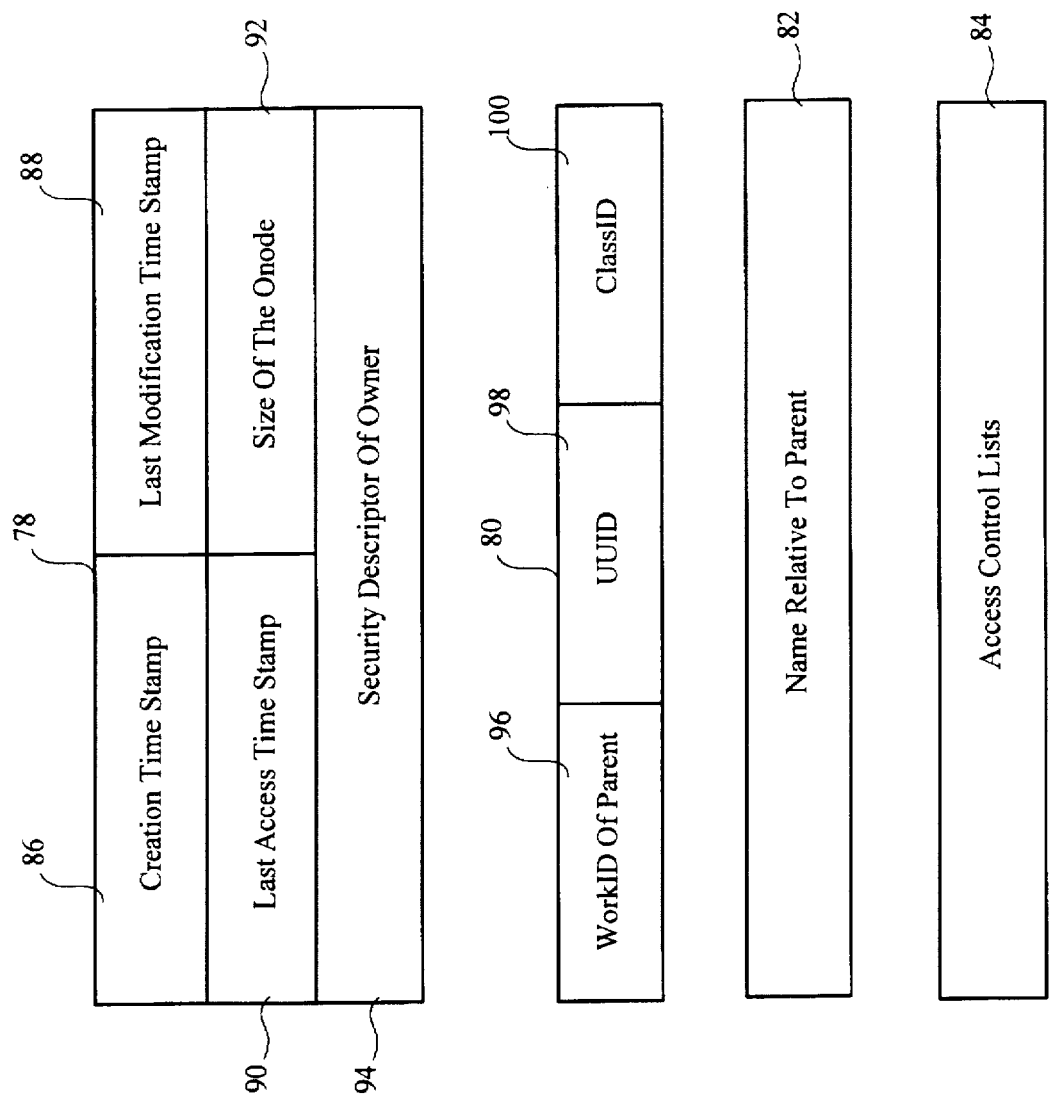
FIG. 12 is a diagram of streams that hold property information about the onode of FIG. 12.

Certain data about onodes 66 is not incorporated directly into the onode. Instead, this data is stored in separate streams as shown in FIG. 12. Stream 78 holds a number of different types of status information regarding its associated onode 66 (FIG. 11). The status information includes a time stamp held in field 86 that specifies the time that the onode 66 was created. Field 88 holds a time stamp that specifies the last time that the onode 66 was modified. Similarly, field 90 holds a time stamp that specifies the last time that the onode 66 was accessed. Field 92 holds a value that specifies the size of the onode 66, and field 94 holds a security descriptor for the owner of the onode. All of the information held in stream 78 is useful in administration of file data held in the associated onode 66.

A second stream 80 of status information is also shown in FIG. 12. This stream 80 includes three fields 96, 98 and 100. Each onode 66 is visible in the global name space of the data processing system 10, and the global name space is a logical tree structure in which each onode other than the root onode has a parent node. Field 96 holds the work ID of the parent onode. Field 98 holds a universally unique ID (UUID) for the onode 66. Lastly, field 100 holds a class ID that specifies the class of the onode 66. Each onode 66 has a unique class associated with it. In particular, each onode 66 is an instance of an object of a particular class.

Two additional streams 82 and 84 of status information are also stored. Stream 82 holds the name of the onode 66 relative to its parent, and stream 84 holds access control lists (used in security) for the onode.

Streams 78, 80, 82 and 84 are stored separately for at least two reasons. First, storing this information separately reduces the average size of the onodes 66. Streams 78, 80, 82 and 84 are not stored for each onode. As a result, the average size of the onodes decreases. Second, storing this information separately allows programmatic access to related groups of information without requiring complex code to retrieve the code from each onode 66.

Figure 13:
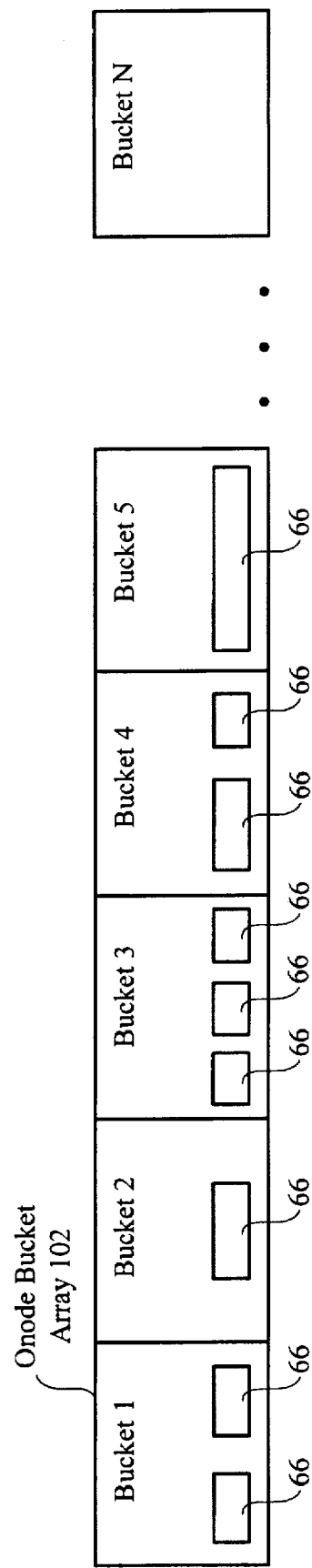
FIG. 13 is a diagram of a bucket array in accordance with the preferred embodiment of the present invention.

Onodes 66 (FIG. 11) are stored in onode bucket arrays 102 (FIG. 13). The onode bucket array 102 is a variable-sized data structure that is composed of an array of fixed-sized buckets. The size of the buckets (e.g., 4K) depends on the architecture of the data processing system 10 but may match the page size of the system 10. The buckets are numbered 1 through N in the example of FIG. 13. Each bucket in the array 102 contains a packed set of onodes 66. In the example of FIG. 13, it can be seen that bucket 2 includes only a single onode, whereas bucket 1 includes two onodes and bucket 3 includes three onodes.

The onode bucket array 102 is used to minimize the amount of data that must be shuffled when file data is moved, deleted or inserted. The granularity of allocation and deallocation of blocks of disk space is fixed. In other words, memory blocks are allocated and deallocated in fixed-sizedd buckets. If, instead, a variable-sized structure was employed for storing file data, the granularity of allocation would not be fixed, and the granularity of allocation could become excessively large.

For efficiency, the operating system 24 (FIG. 1) stores related onodes 66 (FIG. 11) in the same buckets in the array 102 (FIG. 14) or in buckets that are in close proximity to each other on disk in disk storage 16. This storage strategy minimizes seek time in finding onodes 66 on disk. In general, files that are typically accessed together are placed into the same bucket. Examples of files that are accessed together include files in a common subdirectory or directory.

Figure 14:
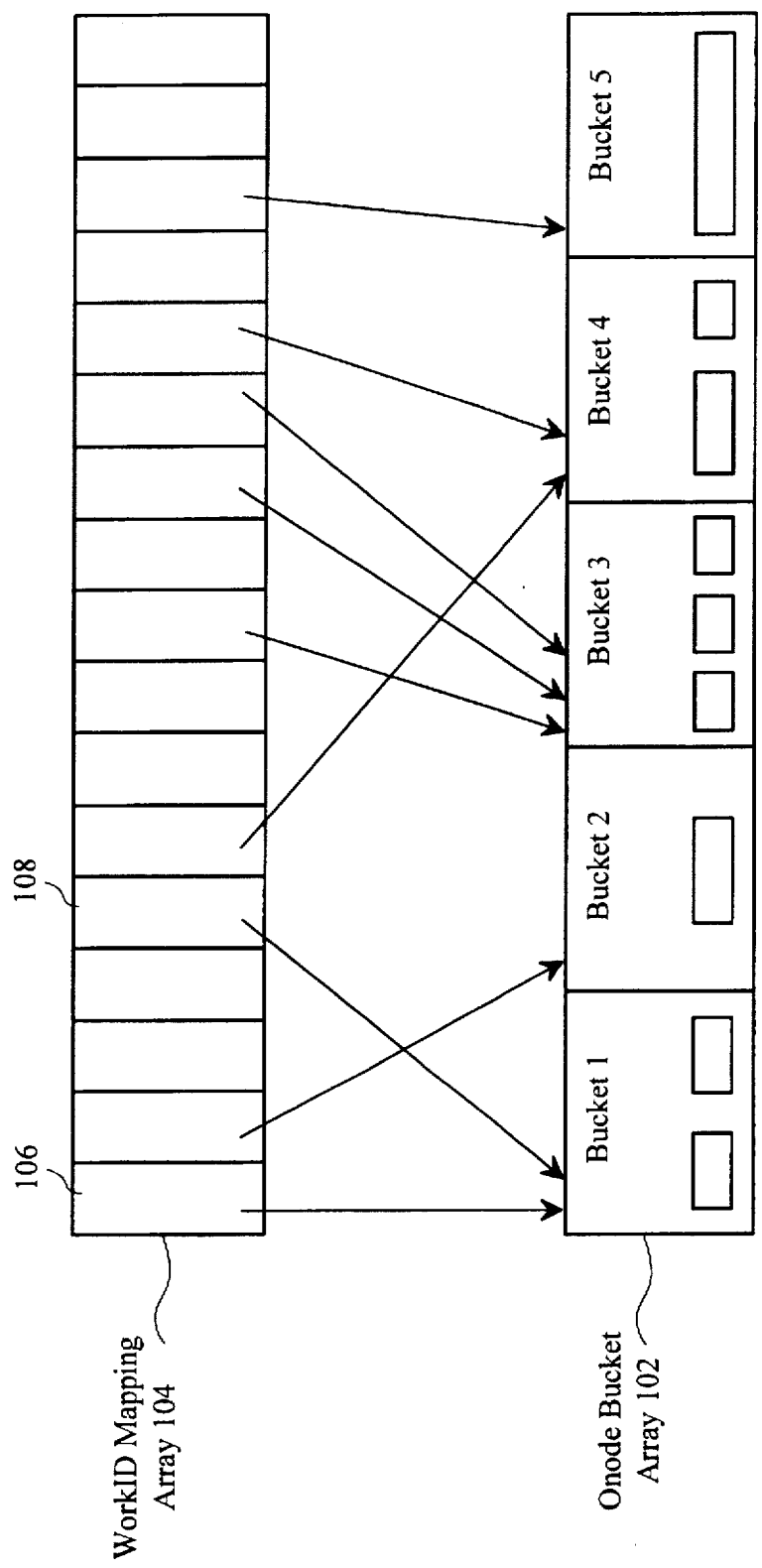
FIG. 14 is a diagram of a work ID mapping array and an onode bucket array in accordance with the preferred embodiment of the present invention.

The onode bucket array 102 (FIG. 13) is accessed as a stream. The system 10 typically stores multiple onode bucket arrays 102 and, thus, stores multiple streams holding the onode bucket arrays. Internally, all references between onodes are based on work IDs. Locating an onode 66 (FIG. 11) within the bucket of an array 102 requires looking for a work ID for the onode. The work ID mapping array 104 (FIG. 14) maps from a work ID to a bucket number of the onode bucket array 102. The numbered bucket is then searched for an onode with a matching work ID. In particular, the work ID of a particular onode 66 serves an index into the work ID mapping array 104. The entry at the specified index identifies the bucket number that holds the onode 66. For example, as shown in FIG. 14, entries 106 and 108 of the work ID mapping array 104 hold values specifying that the onodes 66 having the associated work IDs are held in bucket 1.

Each onode 66 (FIG. 11) includes a name index stream that is stored among the streams held in the array of field descriptor 76. The name index stream holds a B-tree index for the stream descriptors contained within the onode 66. The name index stream uses the stream ID of a stream as a key for locating the stream descriptor held within the onode 66. The B-tree index is described in more detail in co-pending application entitled "Efficient Storage of Objects in a File System", Ser. No. 08/086,344 now U.S. Pat. No. 5,613,105, which was filed on even date herewith and is assigned to a common assignee. The disclosure of that co-pending application is explicitly incorporated by reference herein.

Figure 15:
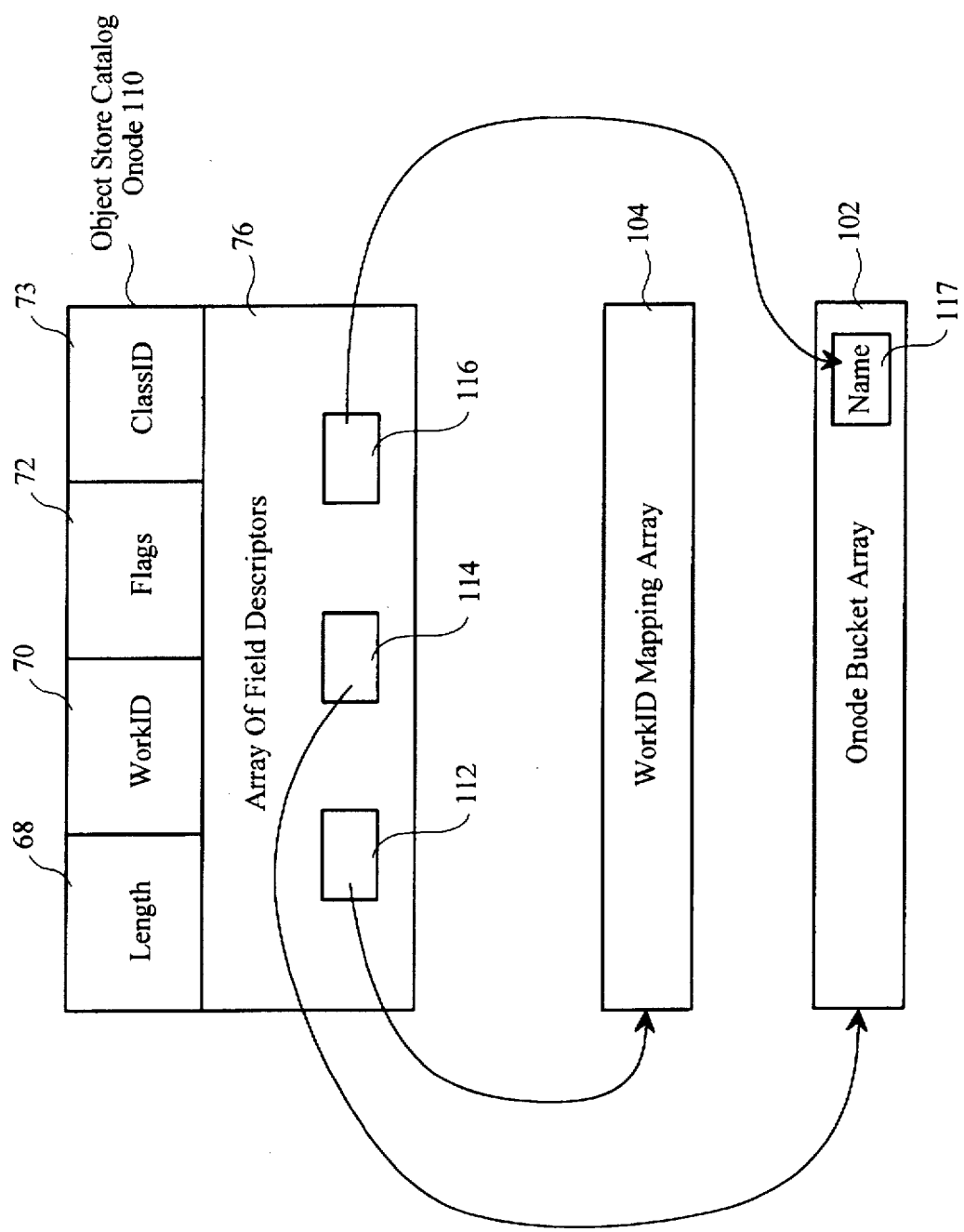
FIG. 15 is a diagram of an object store catalog in accordance with the preferred embodiment of the present invention.

Just as related collection of streams are collected into onodes 66 (FIG. 11), related collections of onodes are collected into data structures known as object store catalogs. The work ID of an onode 66 serves as a basis for identifying any onode within an object store catalog. An object store catalog is described by an object store catalog onode 110, such as shown in FIG. 15. The object store catalog onode 110 includes the length field 68, the work ID field 70, flags field 72 and an array of field descriptors 76 as are found in other onodes 66. The array of field descriptors 76 includes field descriptors in which are stored stream descriptors 112, 114 and 116.

Stream descriptor 112 describes the work ID mapping array stream 104. Stream descriptor 114 describes the onode bucket array stream 102, and stream descriptor 116 describes the name index stream 117. Since the work ID mapping array stream 104 and the onode bucket array stream 102 store related data, they are stored in a common onode (i.e., the object store catalog onode 110). As such, the object store catalog onode 110 provides a vehicle for relating the work ID mapping array stream 104, the onode bucket array stream 102 and the name index stream 117. The object store catalog onode 110 is stored within the group of onodes that constitute the catalog at work ID 0. Work ID 0 is, by definition, always located in the first element of the onode bucket array stream 102. The first bucket at work ID 0 is a distinguished bucket having a known location. The data structures stored within the bucket are, thus, easily and simply accessed.

While the present invention has been described with reference to a preferred embodiment thereof, those skilled in the art will appreciate that various changes in detail and form may be made without departing from the present invention as defined in the appended claims.

We claim:

1. In a data processing system having a file system and a disk storage and a processing means for running an operating system, a method comprising the steps performed by the file system of:
   (a) storing data in the disk storage in a first variable-sized stream data structure provided by the file system comprising logically contiguous data bytes;
   (b) storing meta-data in the disk storage in a second variable-sized stream data structure provided by the file system comprising logically contiguous data bytes and containing a B-tree index to stream data structures that hold data in the disk storage, said meta-data comprising descriptive data of said data in said first variable-sized stream data structure; and
   (c) for each of the stream data structures, storing a stream descriptor that includes a type identifier that identifies how the stream data structure is stored in the disk storage.

2. The method recited in claim 1 wherein the step of storing a stream descriptor for each of the stream data structures further comprises the step of storing a stream descriptor for each of the stream data structures in the respective first and second variable-sized stream data structures.

3. In a data processing system having a file system and a disk storage, a method comprising the steps of:
   (a) storing streams of data in the disk storage in stream data structures provided by the file system and said streams comprising logically contiguous bytes of data;
   (b) storing a stream descriptor for each stream data structure in the disk storage, each stream descriptor including a type identifier that describes how the stream data structure is stored in the disk storage;
   (c) storing stream data structures which store data and their associated stream descriptors in a variable-sized data structure provided by the file system in the disk storage; and (d) storing groups of the variable-sized data structures which store data in a data structure provided by the file system.

4. The method recited in claim 3 wherein the step of storing streams of data in the disk storage in stream data structures further comprises the steps of storing at least one stream of meta-data in the disk storage in a stream data structure provided by the file system and storing at least one stream of data that is not meta-data in the disk storage in a stream data structure provided by the file system.

5. The method recited in claim 3 wherein the step of storing the stream descriptor for each stream data structure in the disk storage further comprises the step of storing the stream descriptor for each stream data structure in the disk storage in another stream data structure provided by the file system.

6. The method recited in claim 3 wherein the step of storing stream data structures which store data and their associated stream descriptors in the variable-sized data structure in the disk storage further comprises the step of storing stream data structures which store data of a file and their associated stream descriptors in the first variable-sized data structure in the disk storage.

7. The method recited in claim 3 wherein the step of storing stream data structures which store data and their associated stream descriptors in the variable-sized data structure in the disk storage further comprises the step of storing stream data structures which store data of a directory and their associated stream descriptors in the first variable-sized data structure in the disk storage.

8. The method recited in claim 3 wherein the step of storing stream data structures which store data and their associated stream descriptors in the variable-sized data structure in the disk storage further comprises the step of storing stream data structures which store data of a subdirectory and their associated stream descriptor in the first variable-sized data structure in the disk storage.

9. The method recited in claim 3, further comprising the step of storing stream data structures that are not stored in the first variable-sized data structure which store data and their associated stream descriptors in a second variable-sized data structure provided by the file system in the disk storage.

10. The method recited in claim 9, further comprising the step of storing the first variable-sized data structure and the second variable-sized data structure in an array of fixed-sized buckets of disk space provided by the file system in the disk storage.

11. The method recited in claim 10, further comprising the step of storing the array of fixed-sized buckets of disk space in the disk storage in a stream data structure provided by the file system.

12. The method recited in claim 11, further comprising the step of storing a stream descriptor for the stream data structure that stores the array of fixed-sized buckets of disk space in one of the variable-sized data structures which store related data.

13. The method recited in claim 11, further comprising the step of storing the data structure in a predetermined fixed-sized bucket of the array of fixed-sized buckets of disk space.

14. In a data processing system having a file system and a disk storage, a method comprising the steps of:

(a) storing streams of data in the disk storage in stream data structures provided by the file system, said streams comprising logically contiguous bytes of data.

(b) storing a stream descriptor for each stream data structure in the disk storage;

(c) storing stream data structures which store related data and their associated stream descriptors in respective variable-sized data structures provided by the file system in the disk storage, each variable-sized data structure having an associated identifier; (d) storing the variable-sized data structures in an array of fixed-sized buckets of disk space provided by the file system, having associated identifiers, in the disk storage;

(e) storing a mapping structure provided by the file system holding entries that specify a bucket identifier for a bucket in the array in the disk storage, said entries being indexed by the identifiers of the variable-sized data structures; and (f) using the mapping structure to locate one of the variable-sized data structures in the array given its identifier.

15. The method recited in claim 14 wherein the array is stored in the disk storage in one of the stream data structures and a stream descriptor for the stream storing the array is stored in disk storage.

16. The method recited in claim 15 wherein the mapping structure is stored in the disk storage in one of the stream data structures and a stream descriptor for the stream storing the mapping structure is stored in disk storage.

17. The method recited in claim 16 wherein the stream descriptor for the stream storing the array and the stream descriptor for the stream storing the mapping structure are stored in a selected one of the variable-sized data structures.

18. The method recited in claim 16 wherein the selected variable-sized data structure is stored in one of the buckets of the array.

19. In a computer system having a file system, a computer-readable storage media holding:

a first variable-sized stream data structure provided by the file system that holds contiguous data bytes;

a second variable-sized stream data structure provided by the file system that holds contiguous data bytes of meta-data;

stream descriptors for each of the stream data structures wherein each stream descriptor includes a type identifier that identifies how the stream data structure is stored;

a variable-sized data structure provided by the file system in which the stream data structures and the stream descriptors are stored; and an array of fixed-sized buckets provided by the file system wherein the variable-sized data structure is stored in one of the buckets.

* * * * *